Patented Oct. 21, 1952

2,615,042

UNITED STATES PATENT OFFICE 2,615,042

PROCESS FOR PREPARING GALLIC ESTERS

Harold von Bramer and Milton L. Clemens, Jr., Kingsport, Tenn., assignors to Eastman Kodak Company, Rochester, N. Y., a corporation of New Jersey No Drawing. Application January 27, 1951, Serial No. 208,228

10 Claims. (Cl. 260—473)

This invention relates to the preparation of esters of gallic acid and more particularly to an improved process for the preparation of n-propyl gallate of an exceptionally high degree of purity.

As is well known, esters of gallic acid can be prepared by more or less conventional esterification procedures involving the reaction of gallic acid with alcohols. For example, gallic acid esters of the lower aliphatic alcohols can be prepared by direct esterification in the presence of catalysts, such as sulfuric acid or anhydrous hydrogen chloride. However, when employing these conventional methods and known catalysts it has been found extremely difficult, if not impossible, to obtain products of good color and physical properties without laborious and extensive purification procedures following the esterification reaction. Such known methods and catalysts have been inadequate in that side reactions usually took place, resulting in the formation of certain undesirable compounds and impurities harmful to the color and purity of the gallic acid ester desired as a product. Of necessity, the formation of such side compounds and impurities also decreased the amount of desired product obtained from the starting materials, resulting in yields often considerably below theoretical values and in increased cost of operation per unit of product obtained.

Even in those cases where one is enabled to obtain a gallic acid ester, such as n-propyl gallate, in good yield it is often found that the product is discolored and impure. Experience has shown that, once an impure material is obtained, it is extremely difcult to purify it economically to the degree required to meet certain industrial applications, since repeated recrystallizations, or other prohibitively costly methods, must be used in any such purification procedures. In any such methods necessitating repeated dissolving and washing operations it is unavoidable that a certain amount of the material sought as a final product be lost in each step. Thus, it has for any practical purpose, been especially difficult, by the use of known methods, to obtain a gallic acid ester, such as n-propyl gallate, of the purity and color required for good grade materials in particular, while at the same time producing such esters in quantities sufficiently large and at a cost sufficiently low to admit of wide-spread, practical industrial application.

The present invention has for its principal object to provide a means of overcoming the difficulties encountered in producing gallic acid esters by the procedures of the prior art. A further object is to provide a process of producing esters of gallic acid of a high degree of purity and free from discoloration. A still further object is to provide an improved process for the production of esters of gallic acid, such as n-propyl gallate, wherein the reaction may be so controlled as to eliminate the possibility of formation of impurities in the product during the reaction. A specific object of the invention is to provide an improved process for the production of n-propyl gallate of a sufficiently high degree of purity as to meet the requirements of good grade material, without the necessity of elaborate purification treatments. Other objects will appear hereinafter.

According to our invention, we accomplish the foregoing objects by heating gallic acid and a saturated aliphatic alcohol (e. g. methyl, ethyl, n-propyl, isopropyl, n-butyl, isobutyl, sec.-butyl, etc. alcohols, e. g. an alcohol containing from 1 to 4 carbon atoms) together in the presence of an alkyl ester of sulfuric acid, e. g. dimethyl sulfate, methyl hydrogen sulfate, diethyl sulfate, ethyl hydrogen sulfate, di-n-propyl sulfate, n-propyl hydrogen sulfate, di-n-butyl sulfate, n-butyl hydrogen sulfate, etc. (e. g., alkyl sulfates containing from 1 to 4 carbon atoms in each alkyl group). It is necessary that the process of our invention be carried out in the substantial absence of strong mineral acids, such as sulfuric, hydrochloric, nitric, phosphoric, etc. acids. The improvements provided by our invention are particularly significant when compared with the above-mentioned deficiencies realized upon esterifying gallic acid according to the known Fischer method, wherein a strong mineral acid, such as sulfuric acid, is utilized. The alkyl group of the catalyst can be same, or different, from that in the esterifying alcohol, since we have found our catalysts to be free from the objectionable side reactions characterizing the strong mineral acids.

In carrying out the esterification, we employ a temperature sufficiently high to promote esterification and yet low enough to maintain good color in the product by precluding the possibility of charring, pyrolysis, or the formation of impurities by undesirable side reactions which are promoted by excessive temperatures. Since water is formed in the esterification reaction, we can advantageously remove this water substantially as soon as it is formed by means of azeotropic distillation employing an entrainer such as benzene, toluene, xylene, or the like, in order to increase the reaction rate and to accomplish completion of the reaction of the acid charged. Alternatively, instead of adding an entraining agent, the esterifying alcohol can be used to remove the water of esterification as a binary azeotrope, and after rectification or decantation (depending on the water solubility of the esterifying alcohol), the unreacted alcohol can be returned to the reaction mixture. Where the reactants contain appreciable quantities of water, this can be removed more conveniently by an entraining agent before esterification is begun.

In general, satisfactory operation can be obtained at atmospheric pressure, although it is possible to operate at pressures below (e. g. 5 to 100 mm.) atmospheric or above (e. g. 500 to 1000 atmospheres). In general, when operating at atmospheric pressure to produce n-propyl gallate we obtain satisfactory esterification at a temperature within the range of 85° to 95° C. However, the actual operating temperature will depend, not only upon the pressure employed, but also upon the amount or proportion of alcohol and the entrainer present, as well as upon the particular alcohol and entrainer employed in the process. In any event the temperature is controlled so as not to exceed a point at which impurities or color would be produced in the product, while yet being sufficiently high to promote esterification.

In carrying out our improved process, a suitable vessel, as for example, a glass-lined reactor of the desired capacity equipped with means for agitating and heating its contents, is charged with the gallic acid and with a substantial excess (e. g. 1.5 to 10 molecular equivalents) of the desired alcohol, as for example, n-propyl alcohol. Advantageously, an entraining agent, such as benzene, is then added. The amount of the entrainer employed will depend upon the type of the equipment used and the reaction conditions desired. In any event, sufficient entrainer can be advantageously added to allow for removal of any water contained in the material charged to the reactor, and more particularly for subsequent removal of water formed during the course of the reaction.

If desired, a metallic powder such as zinc dust, which will prevent oxidation of the esterification product, can be added. The amount of such material is advantageously sufficient to insure that some excess metal is present at all times during the course of the reaction. Ordinarily the weight of the metal so employed will approximate 1% of the weight of the gallic acid charged, although amounts varying from 0.1 to 5% of the gallic acid can be used.

After charging the reactor, heat is applied and the charge mixture dried by removing water by azeotropic distillation through any suitable column attached to the reactor. Such distillation is continued until the azeotrope distilling from the reactor no longer contains a measurable amount of water in the liquid phase of the condensate. The catalyst, an alkyl ester of sulfuric acid, as for example, diethyl sulfate, is then added. Although we prefer to use approximately 10% by weight of the catalyst, based upon the weight of gallic acid charged, this amount may be rather widely varied, as desired, as dictated by an economic balance between cost of catalyst and equipment time. The use of a lesser amount of catalyst will prolong the required reaction time, while a greater amount will increase the rate of reaction. Amounts as low as 1.0% by weight, and as high as 25% by weight based upon the weight of gallic acid charged, can be used.

Heating of the reaction mass is then continued, with agitation, the water of reaction advantageously being continuously removed from the reactor by azeotropic distillation. This operation is continued until approximately the theoretical amount of water, calculated as formed by the esterification of the weight of acid charged, has been removed from the reacting mass.

When n-propyl alcohol has been charged, the temperature during this reaction step is maintained within the range of 85° to 95° C., depending upon the pressure employed and upon the amounts of the alcohol and entrainer, if any, used in the reactor charge. Ordinarily, when n-propyl alcohol and benzene are used, we prefer to operate at a temperature of 88° to 90° C., and at atmospheric pressure.

Upon completion of the reaction the excess alcohol and entraining agent, if any, are removed, ordinarily by distillation at a reduced pressure. Reduced pressure is used in this concentration step largely for the purpose of facilitating the removal of the excess alcohol and entrainer and also to preclude the possibility of charring or decomposition of the esterification product. Ordinarily, we can distill off unreacted alcohol and entrainer at a pressure of approximately 100 mm., although other pressures can be used so long as the temperature is not allowed to rise to a point which will cause decomposition or discoloration of the concentrated esterification product in the reactor. The reaction vessel is then emptied by flushing with warm water, the liquid removed being filtered to eliminate all remaining metallic particles, after which the liquid is chilled to crystallize out the gallic ester product.

It is sometimes advantageous to add a reducing material, such as sodium bisulfite, to the solution during the filtration or cooling steps, to avoid any possibility of discoloration due to atmospheric oxidation while the product solution is still warm. The crystallized product is then filtered, washed with chilled water, and dried.

Our invention will be more readily understood by reference to the following specific examples illustrating the preparation of certain typical gallic acid esters prepared in accordance therewith.

*Example 1*

85 grams (.05 mol) of National Formulary grade gallic acid were mixed with 500 grams (8.3 mols) of n-propyl alcohol and 1 gram of zinc dust in a flask equipped with a fractionation column. 70 to 80 cc. of benzene were added to the mixture, and the contents of the flask heated to 88° to 90° C. The flask was so heated until all water had been removed from the alcohol and acid, then 8.5 grams (0.055 mol) of diethyl sulfate were added to the reaction mixture, and heating was continued while the water of reaction was removed azeotropically as formed until the theoretical amount had been taken off. The time required for the reaction to reach completion was approximately 16 hours. At this point 0.5 gram of zinc dust was added, and the reaction mixture was concentrated by distilling off the excess alcohol and benzene at a pressure of approximately 100 mm. of mercury until the concentrated mass amounted to about 1.5 times the theoretical weight of n-propyl gallate to be obtained. The concentrated reaction product was dissolved in 300 cc. of water at 50° C., and filtered into a vessel containing approximately 1 gram of sodium bisulfite, the filter being washed with an additional 50 cc. of 50° C. water. The filtrate and wash were cooled to 5° C. and filtered, the resultant filter cake being washed with 150 cc. of 5° C. water. The product was dried under vacuum.

n-Propyl gallate of a pure white color and of an exceptional purity meeting the exacting standards of food-grade material was obtained in a yield of 93.3% of the theoretical. The ester had a melting point of 146° to 149° C.

*Example 2*

92 grams of N. F. grade gallic acid of 8.2% water content were mixed with 468 grams of n-propyl alcohol, 150 cc. of benzene, and 1 gram of zinc duct. This mixture was dried azeotropically 2.3 hours at 83.5 to 84.5° C., then 80 cc. of benzene were withdrawn from the system by distillation, and 51 grams of catalyst solution were added. This catalyst solution contained 14.3% by weight n-propyl hydrogen sulfate in n-propyl alcohol. The mixture was heated 21 hours at 87 to 89° C., the water of reaction being removed azeotropically as formed, and then filtered, with the filter cake being washed with a little n-propyl alcohol. The combined filtrate and wash were dried at approximately 20 mm. of mercury pressure to a weight of 161 grams, then 300 cc. of hot water and 9 grams of activated carbon were added and the slurry was boiled for 5 minutes and filtered while hot. A total of 150 cc. of hot wash water were used on the charcoal cake. To the filtrate was added 0.14 gram of sodium bisulfite, then the solution was cooled to 10° C. to effect crystallization, and the resultant product was filtered, the filter cake being washed with 300 cc. of cold water. After drying, the filter cake consisted of white n-propyl gallate melting at 146–148° C. The yield was 92.2% of the theoretical.

*Example 3*

92 grams of N. F. grade gallic acid of 8.2% water content, 510 grams of n-propyl alcohol, 70 cc. of benzene and 1 gram of zinc dust were dried azeotropically for 2.16 hours at 90° C. Next, 10 cc. of benzene and 10 grams of di-n-propyl sulfate were added and the material was heated 16.25 hours at 88.25 to 88.75° C., the water of reaction being removed azeotropically, as formed. Finally, 0.5 gram of zinc dust was added and the mixture was dried at approximately 20 mm. of mercury pressure to a weight of 152.5 grams. This material was dissolved in 300 cc. of warm water, slurried with 1 gram of activated carbon and filtered with 50 cc. of warm water being used to wash the cake. To the filtrate and wash was added 0.5 gram of sodium bisulfite and the solution was cooled adiabatically to start crystallization, then it was cooled to 10° C. in a brine bath and filtered with suction. The product was washed with 300 cc. of 10° C. cold water and dried to give white n-propyl gallate of melting point 145–147° C., the yield being 90.5% of the theoretical.

*Example 4*

92 grams of N. F. grade gallic acid of 8.2% water content, 510 grams of n-propyl alcohol, 150 cc. of benzene and 1 gram of zinc dust were dried azeotropically for two hours at 83.5 to 87.5° C., then 80 cc. of benzene were withdrawn by distillation and 8.5 grams of diethyl sulfate were added. The mixture was dried azeotropically for 16 hours longer at 87.5 to 88.3° C. to remove the water of reaction. Then one gram of zinc dust was added and the mixture was concentrated at approximately 20 mm. mercury pressure to a weight of 165 grams. This material was dissolved in 300 cc. of warm water, then 0.5 gram of sodium bisulfite and 5 grams of activated carbon were added, and the mixture was slurried for a few minutes before it was filtered with suction. After washing the charcoal cake with 50 cc. of warm water, the combined filtrate and wash were cooled adiabatically until crystallization occurred, then it was cooled further in a brine bath to 10° C. The resultant product was separated by filtration and washed with 300 cc. of 10° C. cold water, then dried to give white n-propyl gallate of 146–149° C. melting point in 93.3% of the theoretical yield.

*Example 5*

In the preparation of ethyl gallate 92 grams of N. F. grade gallic acid of 8.2% water content, 500 grams of ethyl alcohol, 150 cc. of benzene, and 1 gram of zinc dust were dried azeotropically from two to four hours at 70–80° C. Then 80 cc. of benzene were withdrawn from the system by distillation and 8.5 grams of diethyl sulfate were added. Next, the reaction mixture was heated 16 to 48 hours at 70 to 80° C., the water formed being removed azeotropically, then 0.5 gram of zinc dust was added and the mixture was dried at 20 mm. of mercury pressure to a weight of 148 grams. This material then was dissolved in 270 cc. of warm water and 0.5 gram of sodium bisulfite and 5 grams of activated carbon were added. The mixture was slurried for a few minutes, then filtered with suction with the charcoal cake being washed with 50 cc. of warm water. Finally, the combined filtrate and wash were cooled to 5° C., filtered with suction and the filter cake was washed with 270 cc. of 5° C. cold water, then dried to give the desired ethyl gallate.

*Example 6*

In the preparation of n-butyl gallate a mixture of 92 grams of N. F. grade gallic acid of 8.2% water content, 500 grams of n-butyl alcohol, 150 cc. of benzene and 1 gram of zinc dust were dried azeotropically for 2 to 3 hours at 80 to 90° C. Then 80 cc. of benzene were withdrawn from the reaction mixture by distillation and 8.5 grams of diethyl sulfate were added. The mixture was dried azeotropically for from 16 to 48 hours at 80–90° C. to remove the water of reaction. Next, 0.5 gram of zinc dust was added to the reactor and the reaction mixture was dried at approximately 20 mm. of mercury pressure to a weight of 170 grams. This material was dissolved in 330 cc. of warm water, then 5 grams of activated carbon were added, and the slurry was stirred for a few minutes, and filtered with suction with the filter cake being washed with 50 cc. of warm water. To the combined filtrate and water was added 0.5 gram of sodium bisulfite, and crystallization was effected by cooling to 5° C. The resultant product was separated by filtration, washed with 330 cc. of cold water, and dried to give a 90% yield of n-butyl gallate of good color and of melting point 133–134° C.

From the above description and examples it will be apparent that, whereas the shortcomings of the prior art have been manifested by the production of esters of gallic acid in poor yield, of an undesirable color, and containing such impurities as to make them capable of use in food grade materials only after purification procedures involving many complicated and costly steps, we have now succeeded in preparing esters of gallic acid of a pure white color and of such an exceptionally high degree of purity as to be suited for use in food grade materials without any necessity of elaborate purification treatments. It will also be apparent that we have made it possible to produce such exceptionally pure esters of gallic acid in higher yields, in considerably larger quantities, and at substantially lower costs than heretofore possible. The process of our invention can be operated in a discontinuous, or continuous, manner. Continuous operation can advantageously be effected by withdrawing continuously a portion of the reaction mixture, separating unreacted materials and returning these materials to the reaction mixture. The azeotrope distilling off can likewise be rectified, or mechanically separated into its component parts and the entraining agent, or unreacted alcohol, returned to the reaction mixture.

What we claim as our invention and desire to secure by Letters Patent of the United States is:

1. A process for preparing alkyl esters of gallic acid comprising heating gallic acid and a saturated aliphatic alcohol containing from 1 to 4 carbon atoms together in the presence of an alkyl ester of sulfuric acid.

2. A process for preparing n-propyl gallate comprising heating gallic acid and n-propyl alcohol together in the presence of an alkyl ester of sulfuric acid.

3. A process for preparing n-propyl gallate comprising heating gallic acid and n-propyl alcohol together in the presence of diethyl sulfate.

4. A process for preparing ethyl gallate comprising heating gallic acid and ethyl alcohol together in the presence of diethyl sulfate.

5. A process for preparing esters of gallic acid comprising heating gallic acid and a saturated aliphatic alcohol containing from 1 to 4 carbon atoms together in the presence of an alkyl ester of sulfuric acid, azeotropically distilling off the water as formed, and separating the ester from the reaction mixture.

6. A process for preparing n-propyl gallate comprising heating gallic acid and n-propyl alcohol together in the presence of an alkyl ester of sulfuric acid, azeotropically distilling off the water as formed, and separating the n-propyl gallate from the reaction mixture.

7. A process for preparing n-propyl gallate comprising heating gallic acid and n-propyl alcohol together in the presence of diethyl sulfate, azeotropically distilling off the water as formed, and separating the n-propyl gallate from the reaction mixture.

8. A process for preparing ethyl gallate comprising heating gallic acid and ethyl alcohol together in the presence of diethyl sulfate, azeotropically distilling off the water as formed, and separating the ethyl gallate from the reaction mixture.

9. A process for preparing n-propyl gallate comprising heating gallic acid and n-propyl alcohol together at a temperature of 85° C. to 95° C. in the presence of diethyl sulfate and benzene, azeotropically distilling off the water formed as a water-benzene azeotrope, and separating the n-propyl gallate from the reaction mixture.

10. A process for preparing n-butyl gallate comprising heating gallic acid and n-butyl alcohol together in the presence of diethyl sulfate.

HAROLD VON BRAMER.
MILTON L. CLEMENS, JR.

REFERENCES CITED

The following references are of record in the file of this patent:

Ault et al., J. Am. Chem. Soc. 69, 2003–2005 (1947).